Jan. 8, 1952     F. W. SCHWINN     2,582,072
BATTERY CASE
Filed May 1, 1948     2 SHEETS—SHEET 1
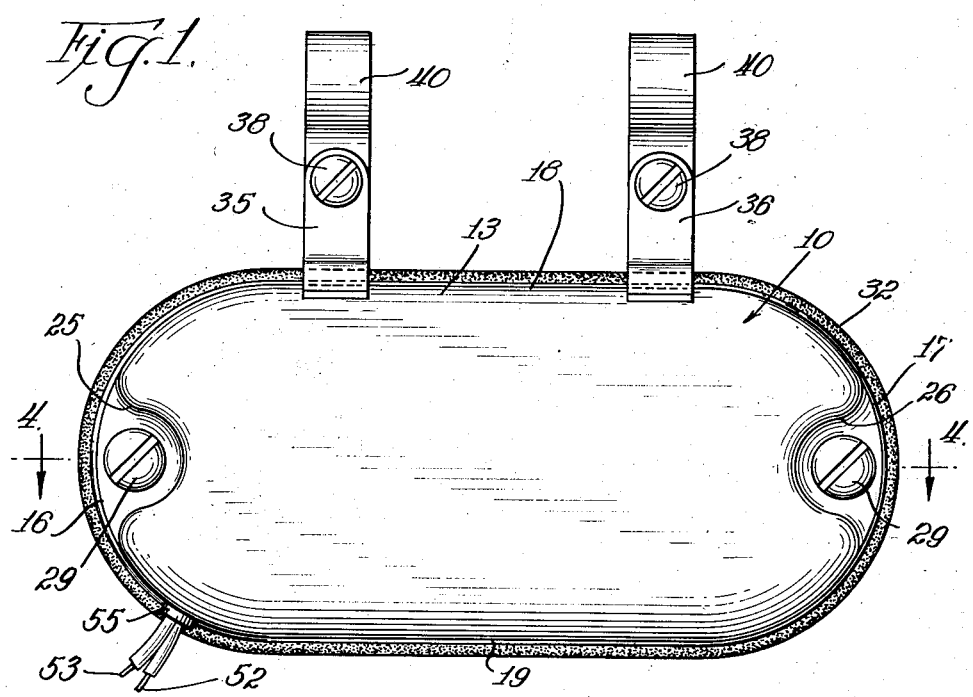
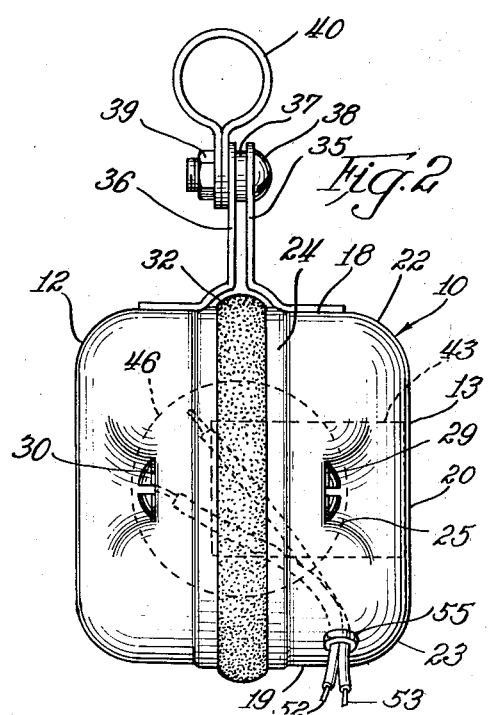
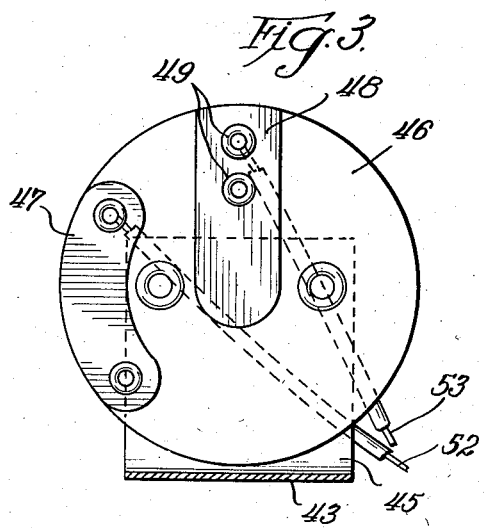
Inventor:
Frank W. Schwinn
By:- Albert J. McCaleb
Atty.

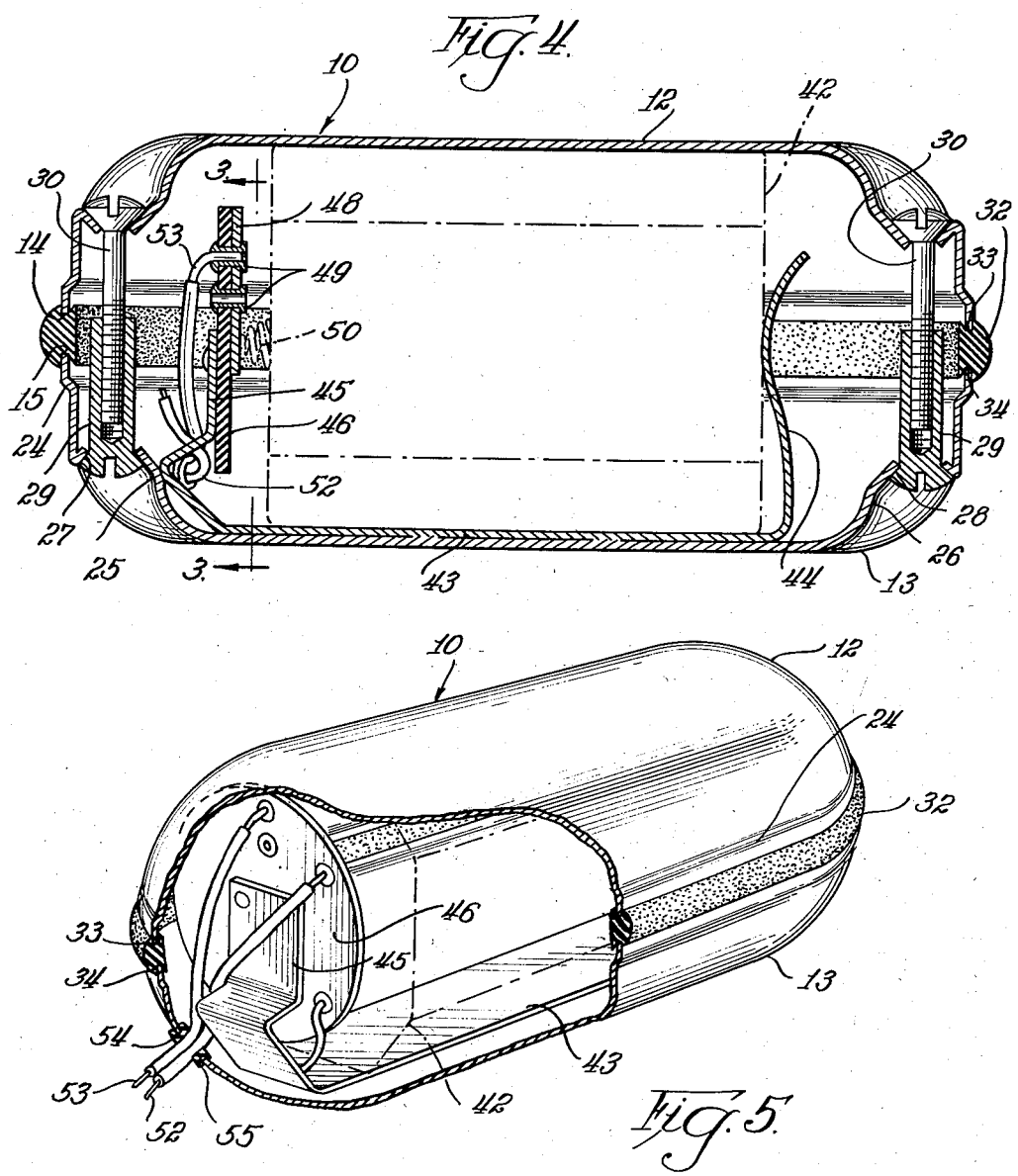

Patented Jan. 8, 1952

2,582,072

UNITED STATES PATENT OFFICE 2,582,072

BATTERY CASE

Frank W. Schwinn, Chicago, Ill.

Application May 1, 1948, Serial No. 24,561

2 Claims. (Cl. 136—173)

This invention relates to battery cases and more particularly to those of the class used to carry batteries for lighting, ignition, signal energizing and the like on vehicles and portable equipment.

One of the more general objects of my invention is to provide a strong, waterproof and durable battery case which can be manufactured at low cost.

It is another and more specific object of the invention to provide a two part formed metal battery case constructed and arranged so that both parts are generally identical and may be made with the same tools and dies.

My invention also has within its purview the provision of a battery case which is not only constructed and shaped to effect space economy and neat appearance, but also with a view to the contribution of strength and ruggedness.

Another object of my invention is to provide a battery case having separable parts which, when closed, are substantially sealed against dust and moisture by a gasket of rubber or the like material.

For a further object my invention contemplates the achievement of a balance in a battery case between weatherproofing, accessibility to the interior, strength, space requirements and cost.

Other objects and advantages of the invention will be apparent from the following description and the accompanying drawings in which similar characters of reference indicate similar parts through the several views.

Referring to the two sheets of drawings,

Figs. 1 and 2 are respectively side and end elevational views of a battery case embodying a preferred form of my invention;

Fig. 3 is an end sectional view of a detail of one form of internal structure adapted to use in the battery case of Figs. 1 and 2 and wherein the section is taken substantially on a line 3—3 of Fig. 4 and in the direction indicated by accompanying arrows;

Fig. 4 is a top sectional view of the battery case shown in Figs. 1 and 2 and wherein the section is taken substantially on a line 4—4 of Fig. 1 and viewed in the direction indicated by arrows; and Fig. 5 is a perspective view with a portion of the outer closure broken away to show internal construction, and wherein the view is taken from a position looking somewhat downwardly toward one side of the case and toward one end and the bottom thereof.

In the exemplary form of my battery case which is disclosed in the accompanying drawings for illustrative purposes, a housing 10 is composed of two integrally formed, cupped and preferably drawn sheet metal halves 12 and 13, divided along a longitudinal central plane and preferably of like contours, as well as possessing symmetry such that they are adapted to assembly in opposed relationship when made with the same or like tools and dies. In the present instance, and in addition to the housing being divided along a longitudinal central plane, each of the halves is symmetrical with respect to perpendicularly disposed longitudinal and lateral central planes. As a further characteristic, each of the halves 12 and 13 presents a continuous and substantially coplanar edge 14 and 15 respectively, which edges, in assembly of the battery case, are disposed in aligned and opposed relationship.

As a result of the aforementioned similarity of the contours of the two halves of my battery case, a description of one will suffice for both. Viewed from the side, as shown in Fig. 1, end surfaces 16 and 17 of each half are curved and, by preference, substantially semi-circular, with the intervening top and bottom surfaces 18 and 19 respectively substantially straight. Viewed from the end, as in Fig. 2, each half of the housing has a substantially flat side wall portion 20 adjoined with the top, bottom and end surfaces through smoothly curved and exteriorly convex portions such as 22 and 23. Near the coplanar edge, as depicted in Figs. 2 and 4, each half is provided with an offset formed edge portion 24 which adds rigidity thereto.

At the opposite ends, and preferably at a central position, each half is formed to provide exterior recessed portions 25 and 26, which recessed portions serve to stiffen and rigidify the ends of the halves. Additionally, each of the recessed portions 25 and 26 is provided with a countersunk aperture 27 and 28 respectively, for the accommodation of a threaded securing element, such as nipples 29 and screws 30 (Fig. 4).

With the halves thus formed, and adapted to assembly in opposed relationship, the adjacent and opposed edges 14 and 15 are, in my preferred structure, substantially sealed against the leakage of moisture or dirt by an endless gasket 32 of a flexible waterproof material, such as natural or synthetic rubber. Along its opposed lateral edges, the gasket 32 is preferably provided with grooves 33 and 34 in opposed relationship which receive the edges of the respective halves in their assembled relationship. When the halves are thus assembled with the gasket 32 therebetween, they are tightly and securely fastened in that relationship by the tightening of the screws 30 relative to the nipples 29 to draw the ends of the halves together.

To provide for the support of the housing 10 with reference to a bicycle frame or other structure with which the battery case is used, while still maintaining desired structural symmetry of the halves, outwardly projecting brackets 35 and 36 are secured to each of the halves in longitudinally spaced relationship and adjacent the coplanar edge thereof, as by spot welding to the top surface 18. The positions of the brackets longitudinally of each housing half are preferably selected with reference to a central plane, so that as shown in Fig. 2, the brackets 35 and 36 of the opposed halves are in aligned and opposed relationship when the halves are assembled. In my disclosed structure, the brackets of the respective halves are separated by a spacer such as 37 and are secured together by fastening means such as screws 38 and coacting nuts 39. For mounting the battery case relative to a bicycle bar or the like, a loop 40 is secured to each opposed pair of brackets by the screw 38 and its accompanying nut. It may be readily appreciated that in addition to providing a support for the battery case, the brackets 35 and 36, when thus disposed and secured, serve additionally to rigidify and strengthen the case structure and hold the halves in their assembled relationship; thus providing insurance against loosening or deformation of the halves under any adverse operating conditions, such as vibration or jolting.

The disclosed embodiment of my battery case, although not limited thereto, is adapted to the use of a battery which is indicated in dot and dash lines at 42 and which is commonly known as a "lantern battery" which embodies a plurality of cells connected together and enclosed in a common wrapper. For locating the battery longitudinally within the housing 10 and making electrical connections thereto, I have provided a resilient and longitudinally extending leaf spring type of clip 43 which is secured to the interior of the side wall of one of the halves, as shown in Figs. 2, 4 and 5. At one end, the spring has a curved and inwardly projecting end portion 44 which is adapted to engage and make electrical contact with the base of the battery. At the other end, the clip has an inwardly projecting bracket portion 45 which carries an insulating block 46, which insulating block serves as a support and anchor for connector terminals 47 and 48. The connector terminal 48 is secured to the insulating block by means such as eyelets 49 and extends inwardly to a position for making contact with a terminal such as 50 of the battery. The other connecting terminal 47 is grounded to the clip 43 and serves as an anchor for a lead wire 52; another lead wire 53 being anchored to the connecting terminal 48. The lead wires 52 and 53 extend from the housing through an aperture 54 in one of the halves, which aperture is desirably provided with a protective grommet 55.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A battery case comprising, in combination, two drawn sheet metal halves each presenting coplanar edges adapted to assembly in opposed and symmetrical relationship with reference to a central longitudinal plane, each of said halves being substantially symmetrical with respect to central planes extending longitudinally and laterally thereof, said halves also having formed recess portions at their opposite ends with apertures therein for receiving securing means by which said halves are secured together, said formed recess portions being contoured of sufficient size to impart substantial rigidity to end portions of the halves, an endless gasket of waterproof material having opposed grooves for receiving said coplanar edges in their opposed and assembled relationship, similar and outwardly projecting clamp brackets secured in opposed and longitudinally spaced relationship adjacent longitudinal portions of said edges on one side of the case, and battery holding and contacting elements mounted in one of the halves.

2. A battery case comprising, in combination, a housing composed of drawn sheet metal halves having substantially identical surface contours and each presenting a continuous coplanar edge, said halves being otherwise symmetrically shaped in relation to a lateral plane passing midway between the ends so that the said edges thereof are opposed when the halves are aligned in opposed relationship, a continuous gasket of a flexible and waterproof material of a size and having opposed grooved edges for receiving and substantially sealing said coplanar edges of the halves, means for securing the halves together in opposed relationship with said gasket therebetween, similar bracket elements secured to the two halves in opposed relationship to provide a support structure for the case, and a resilient battery holding element mounted in one of the halves and carrying terminal connectors for a battery.

FRANK W. SCHWINN.

REFERENCES CITED

The following references are of record in the file of this patent:

UNITED STATES PATENTS

| Number | Name | Date |
| --- | --- | --- |
| 585,448 | Quackenboss | June 29, 1897 |
| 1,150,023 | Ford | Aug. 17, 1915 |
| 1,250,960 | Brownrigg et al. | Dec. 25, 1917 |
| 1,432,075 | Mallu | Oct. 17, 1922 |
| 1,463,360 | Foote | July 31, 1923 |
| 2,040,371 | Gough | May 12, 1936 |
| 2,210,183 | Schweighart | Aug. 6, 1940 |
| 2,252,088 | Meyerhoefer | Aug. 12, 1941 |
| 2,323,312 | Crimmins | July 6, 1943 |
| 2,526,101 | West, Jr. et al. | Oct. 17, 1950 |
| 2,527,576 | Ruben | Oct. 31, 1950 |

FOREIGN PATENTS

| Number | Country | Date |
| --- | --- | --- |
| 310,568 | Germany | Dec. 29, 1914 |
| 510,629 | Great Britain | Aug. 4, 1939 |
| 527,278 | Great Britain | Oct. 4, 1940 |